United States Patent [19]

Graf et al.

[11] Patent Number: 5,058,701
[45] Date of Patent: Oct. 22, 1991

[54] PASSIVE RESTRAINT SYSTEM WITH MANUAL LAP BELT INTERLOCK

[75] Inventors: Michael C. Graf, Allen Park; David R. Tengler, Franklin, both of Mich.

[73] Assignee: Ford Motor Company, Dearborn, Mich.

[21] Appl. No.: 592,003

[22] Filed: Oct. 1, 1990

[51] Int. Cl.⁵ .............................................. B60R 21/10
[52] U.S. Cl. ..................................... 180/268; 280/804
[58] Field of Search ................. 180/268; 280/802, 804

[56] References Cited

U.S. PATENT DOCUMENTS

| | | | |
|---|---|---|---|
| 4,763,750 | 8/1988 | Yoshitsugu | 180/268 |
| 4,779,700 | 10/1988 | Kataoka | 180/268 |
| 4,781,267 | 11/1988 | Wained et al. | 180/268 |
| 4,790,405 | 12/1988 | Kataoka | 180/268 |
| 4,896,741 | 1/1990 | Kawai et al. | 180/268 |
| 4,896,742 | 1/1990 | Shitanoki et al. | 180/270 |

OTHER PUBLICATIONS

Consumer Reports, Oct. 1990, p. 685.

*Primary Examiner*—Kenneth R. Rice
*Attorney, Agent, or Firm*—Mark Mollon; Roger L. May

[57] ABSTRACT

A passive restraint system includes a torso belt automatically securing a vehicle occupant by moving from a forward position along a track to a rearward position to secure the occupant. A belt carrier carries one end of the torso belt along the track while the other end of the torso belt is retained on a belt retractor. The system also includes a manual lap belt which is secured by the vehicle occupant around the hips. Movement of the torso belt from the rearward to the forward position is prevented, even upon opening of the vehicle door, as long as the manual lap belt is engaged.

5 Claims, 3 Drawing Sheets

PASSIVE RESTRAINT SYSTEM WITH MANUAL LAP BELT INTERLOCK

BACKGROUND OF THE INVENTION

The present invention relates in general to automotive passive restraint systems, and more particularly to a control circuit for a motorized passive restraint system.

The passive restraint system in a motor vehicle is responsible for providing automatic seatbelt protection to the vehicle occupants. The operation of the system is defined according to certain conditions such as the open or closed position of a door and the occurrence of certain events, such as the turning on of the vehicle ignition switch. As required, a torso belt of the passive restraint system will travel along a track from a forward position to a rearward position to secure an occupant. Other conditions and events will cause the torso belt to travel to the forward position to allow an occupant to enter or leave the vehicle.

In addition to the torso belt, a manual lap belt is provided for securing about the hips of the occupant. The lap belt is pulled out from a retractor and latches with a buckle. A sensor in the buckle provides a signal indicating whether the lap belt is engaged so that a warning or reminder signal can be given to an occupant.

The torso belt travels by means of a motor-driven carrier riding in a track along the door frame. As the belt carrier moves from the "A" pillar at the forward position toward the "B" pillar at the rearward position, the torso belt spools out of a retractor usually located at the base of the vehicle seat at the opposite side of the occupant from the door. The unspooling of the torso belt provides sufficient belt length to extend from the retractor, around the vehicle occupant, and to the rearward position of the belt carrier at the "B" pillar.

The belt carrier is driven by a reversible electric motor through a drivebelt which interconnects the belt carrier and the motor. A control circuit actuates the motor based on the above-mentioned conditions which are determined by signals from a plurality of sensors. The sensor signals are evaluated by logic circuitry which control when and in which direction the reversible motor is actuated.

One of the variables used in prior art passive belt systems to decide whether to locate a belt in the forward or rearward position is the open or closed state of the door corresponding to that belt. For example, when the door is opened the belt will move to the forward position (except during a crash when an inertia switch prevents operation of the reversible motor). By locating the belt in the forward position, the driver or passenger can enter or exit the vehicle independent of the on or off state of the ignition.

For safety reasons, the vehicle doors should not normally be opened while the vehicle is in motion. A problem arises in the prior art passive belt system when it becomes necessary to open a door while in motion, such as during the backing-up of the vehicle near an obstacle or with an obscured (e.g., fogged or frosted) rear window. When the occupant opens the door and leans out of the vehicle, the torso belt moves forward even though the occupant has no intention of exiting.

SUMMARY OF THE INVENTION

It is a principal object of the present invention to provide a passive restraint system wherein a movement of the torso belt to a forward position does not occur unless the occupant is attempting to exit the vehicle when he/she opens a door.

It is a further object of the invention to provide a passive belt system for a vehicle and a method of operating such a system having improved safety for the vehicle occupant.

These and other objects are achieved by employing a carrier motor control circuit which is responsive to the engaged or nonengaged condition of the manual lap belt tongue with the respective buckle. The present invention assumes that the vehicle occupant only wants the torso belt to move forward if his or her lap belt is unbuckled. Thus, the control circuit prevents movement of the torso belt carrier from the rearward position to the forward position whenever the lap belt is engaged. Preferably, an electrical switch is incorporated with the buckle in order to provide a lap belt signal indicating whether the lap belt is engaged.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
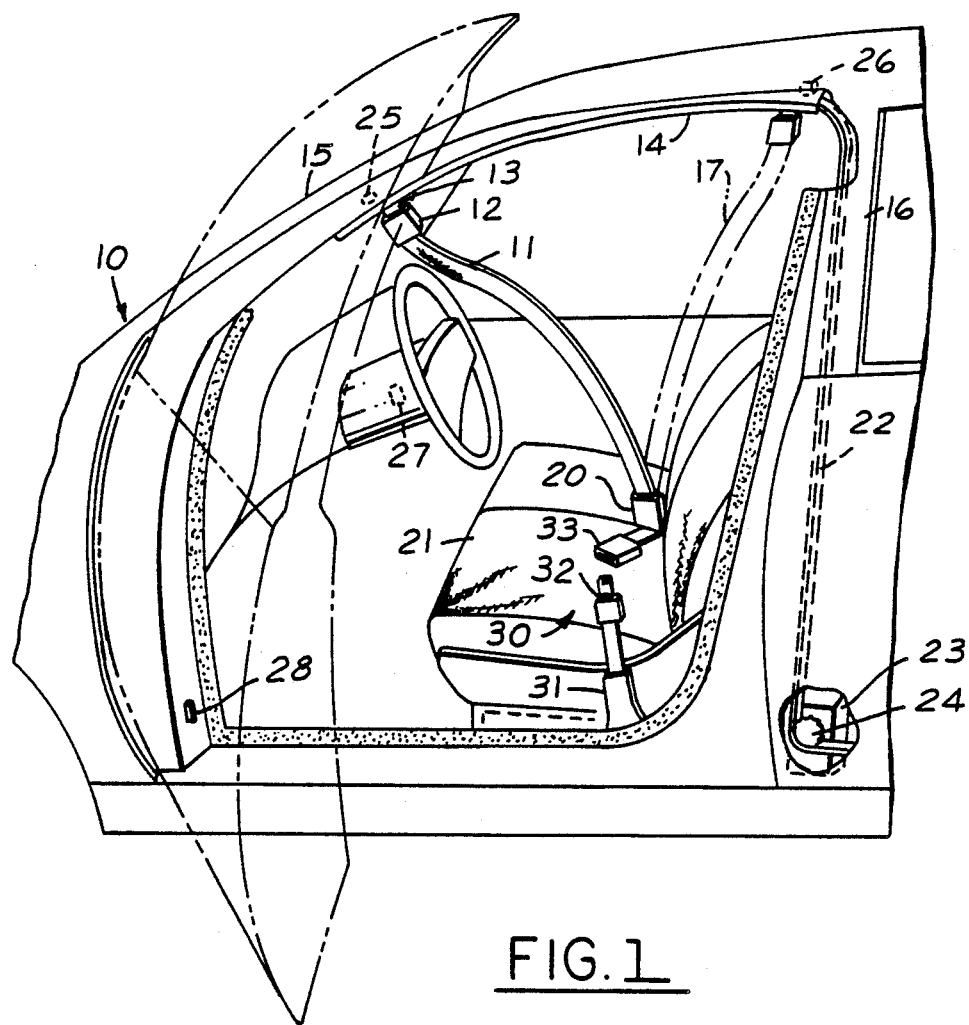
FIG. 1 is a partial perspective view of a vehicle including a passive restraint system.

Referring to FIG. 1, a vehicle generally designated as 10 has a passive restraint belt system including a torso belt 11. At one end of torso belt 11 is an emergency release buckle 12 which releaseably connects with a belt carrier 13. Belt carrier 13 is received for slidable movement in a track 14 which extends from the front or "A" pillar 15 to the rear or "B" pillar 16. Track 14 is affixed to the vehicle roof so that belt carrier 13 can be driven between a forward position at the "A" pillar and a rearward position at the "B" pillar as shown in phantom at 17.

The other end of torso belt 11 is received within a latchable retractor 20 which is secured to the floor of the vehicle near the bottom edge of a seat 21. Torso belt 11 is free to spool in or out from retractor 20 during movement of belt carrier 13 (except that belt 11 cannot spool out when retractor 20 becomes latched due to an acceleration exceeding a predetermined acceleration). With an occupant located in seat 21 and with belt carrier 13 moving from a forward to a rearward position, torso belt 11 will be required to spool out from retractor 20 to provide sufficient length of the torso belt 11 to extend from retractor 20, around the occupant, and to the "B" pillar location of belt carrier 13.

Belt carrier 13 is connected to a drivebelt 22 within track 14. Drivebelt 22 extends through track 14 from belt carrier 13 to a motor 23 and engages a sprocket wheel 24 driven by motor 23. Thus, rotation of motor 23 in one direction causes movement of belt carrier 13 toward a rearward position and rotation of motor 23 in the opposite direction causes movement of belt carrier 13 toward a forward position. A pair of limit switches 25 and 26 sense the presence of belt carrier 13 at the forward and rearward positions, respectively.

The correct location of the passive restraint belt carrier at any moment is dependent on certain monitored conditions, including the state of an ignition switch 27 which may be either on or off. A door switch 28 provides a signal which indicates the open or closed position of its respective vehicle door. Furthermore, movement of belt carrier 13 is dependent on the occurrence of a trigger event which initiates belt carrier movement. Following a trigger event, a time period of limited duration begins during which motor 23 is energized.

Also shown in FIG. 1 is a manual lap belt 30 retained by a manual lap belt retractor 31. Manual lap belt 30 includes a tongue 32 at its end for latching into a buckle 33. Buckle 33 is secured to the floor of the vehicle on the interior side of the occupant. The occupant pulls lap belt 30 out of retractor 31 and toward buckle 33 so that tongue 32 can be inserted in buckle 33 until the lap belt is engaged.

Figure 2:
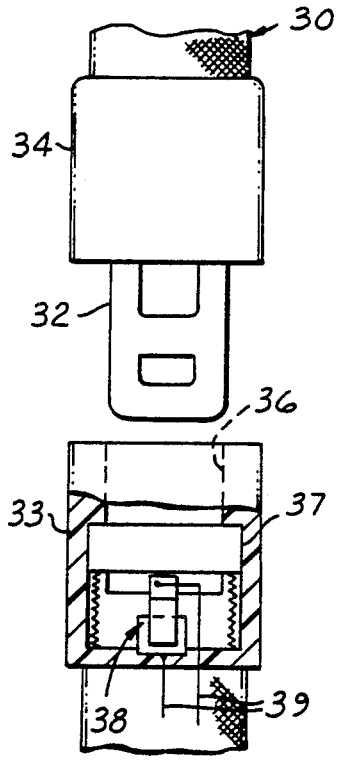
FIG. 2 is a front plan and sectional view of a manual lap belt mechanism according to the present invention.

FIG. 2 shows the lap belt latching mechanism in greater detail. Tongue 32 is joined with manual lap belt 30 inside a cover 34. A slot 36 is provided in buckle 33 for receiving tongue 32. A spring-loaded sliding bar 37 is contained within buckle 33 for contacting tongue 32 during its insertion.

Upon insertion of tongue 32, sliding bar 37 is forced into contact with a switch 38 in buckle 33. A pair of leads 39 is connected to switch 38 for providing a signal which indicates the position of switch 38 as determined by the engaged or disengaged condition of tongue 32 in buckle 33.

Figure 3:
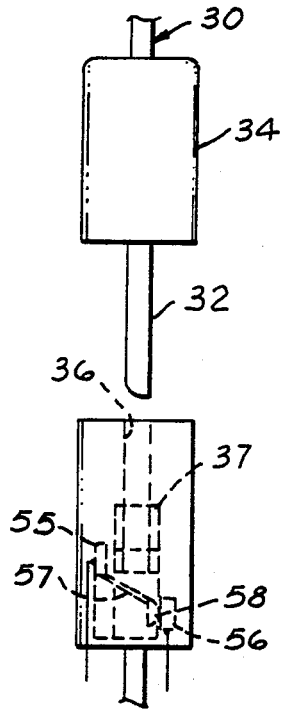
FIG. 3 is a side plan and sectional view of the lap belt mechanism of FIG. 2 prior to engagement.

As shown in FIG. 3, switch 38 is preferably comprised of a normally closed switch including a terminal 55 and a terminal 56 connected to leads 39. A spring contact 57 is fixed to terminal 55 and has a rounded tip 58 which normally contacts terminal 56.

Figure 4:
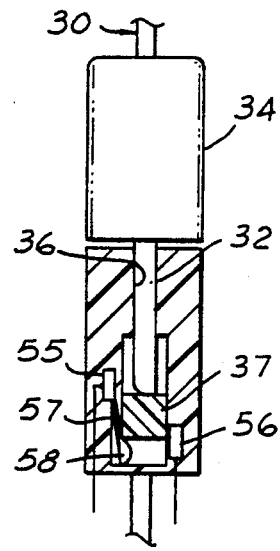
FIG. 4 is a side plan and sectional view of the lap belt mechanism of FIG. 2 after engagement.

When tongue 32 is inserted into buckle 33, as shown in FIG. 4, tongue 32 is engaged by a latching mechanism (not shown) at the full insertion point. Simultaneously, sliding bar 37 is forced into spring contact 57 whereby rounded tip 58 is disengaged from terminal 56 thereby opening the switch. Thus, switch 38 provides a lap belt signal indicating the engagement of the lap belt which can be employed to prevent movement of the torso belt from the rearward to the forward position should the vehicle door be opened.

Figure 5:
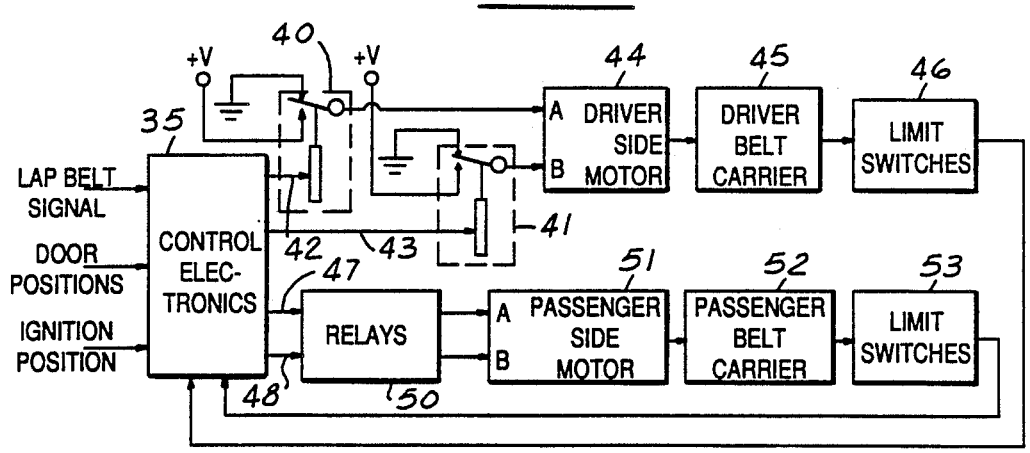
FIG. 5 is a schematic, block diagram of portions of the passive restraint system.

Turning now to FIG. 5, control electronics 35 controls the operation of the passive restraint belt drive motors for the driver side and passenger side as shown. Control electronics 35 senses a plurality of input conditions including the manual lap belt signals (i.e., for the driver and passenger sides), door position signals, an ignition position signal, and limit switch signals which provide information on the current location of the torso belt carriers.

The driver side of the passive restraint system includes a relay 40 connected to be energized by control electronics 35 on a control line 42 and a relay 41 connected to be energized by control electronics 35 on a control line 43. The outputs of relays 40 and 41 are connected to a driver side belt motor 44 which is a reversible dc motor, the direction of rotation depending on the energizing of the motor at its "A" input or its "B" input by relays 40 or 41, respectively. Motor 44 is mechanically connected to a driver side belt carrier 45 which engages limit switches 46 depending on its position at either end of a track. The outputs of limit switches 46 are coupled to control electronics 35.

In operation, the input signals corresponding to the driver side of the passive restraint system cause control electronics 35 to select the one of relays 40 or 41 which corresponds to the appropriate position of the belt carrier at either the "A" pillar or the "B" pillar. However, the selected relay is not energized unless a timer in control electronics 35 is activated by a change (i.e., transition) in one of the input signals. During a limited time period initiated by a transition, control electronics 35 energizes the selected relay over corresponding control line 42 or 43 causing the selected relay to provide a voltage $+V$, supplied as shown, to energize motor 44. Movement of the belt carrier to the end of track at the desired position causes the opening of a corresponding limit switch which in turn causes control electronics 35 to deenergize the relay.

A transition in the driver's side door signal indicating that the door has been opened is a possible triggering event for causing belt carrier 45 to move to the forward position. However, if driver belt carrier 45 is in its rearward (i.e., restraining) position and the driver's side lap belt signal indicates that the lap belt is engaged, then control electronics 35 does not energize the relay. If subsequently the lap belt is disengaged and the door is still open, then the transition in the lap belt signal will cause control electronics 35 to energize the relay.

The passenger side of the passive restraint system is substantially identical to the driver side. Control electronics 35 is connected to a pair of relays 50 over control lines 47 and 48. Relays 50 are connected to an "A" input and "B" input of a passenger side belt motor 51 which provides motive power to a passenger side belt carrier 52. Limit switches 53 are provided for contact with passenger side belt carrier 52 at its front and rear positions.

Figure 6:
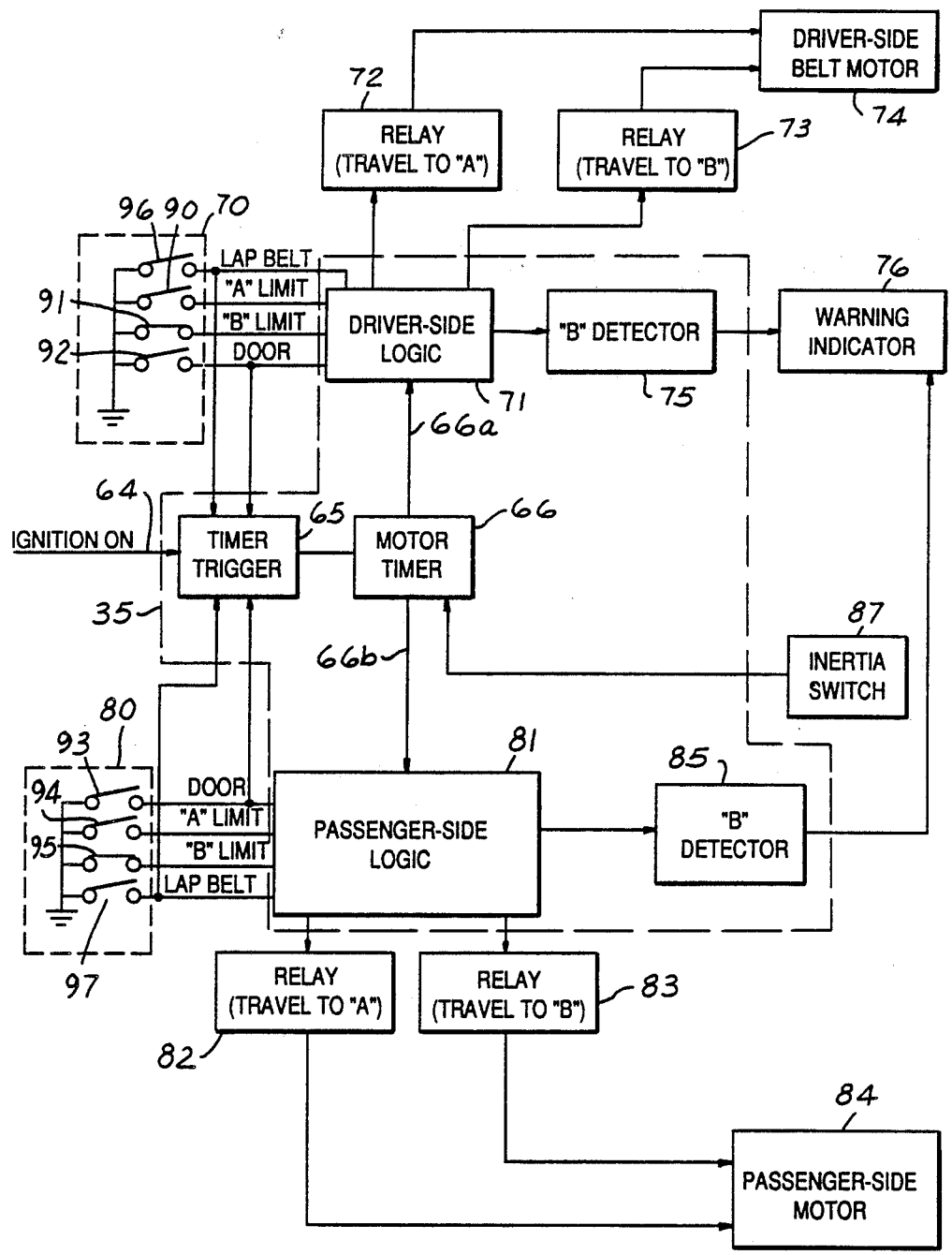
FIG. 6 is a detailed schematic, block diagram showing the electronic motor control system of the present invention.

Referring to FIG. 6, the electrical portion of the passive restraint system of the present invention is shown in greater detail. Control electronics module 35 includes a timer trigger 65 which receives an IGNITION ON signal on a line 64 to indicate the state of the ignition switch. Timer trigger 65 may include a monostable multivibrator, for example. The output of timer trigger 65 is connected to an input of a motor timer 66. Motor timer 66 provides an output signal at its outputs 66a and 66b for a predetermined length of time (e.g., 7.5 seconds or some other period sufficient to allow full travel of the belt carrier) when it receives a trigger signal from timer trigger 65.

The driver side portion of the passive restraint system includes sensors 70 to monitor input conditions for determining the direction and triggering of the driver side belt carrier. An "A" limit switch 90, a "B" limit switch 91, a door switch 92, and a lap belt switch 96 each have one side connected to ground and another side connected to a driver side logic block 71. Door switch 92 and lap belt switch 96 are further connected to timer trigger 65.

Driver side logic 71 is connected to motor timer output 66a and has outputs connected to relays 72 and 73 which are connected to driver side belt motor 74. Driver side logic 71 has another output connected to a "B" detector 75 for determining the failure of the belt carrier to reach the rearward position at the "B" pillar. "B" detector 75 is connected to a warning indicator 76 for signaling a vehicle occupant that the belt carrier has failed to reach the "B" position.

The passenger side portion of the passive restraint system includes sensors 80, including a passenger door position switch 93, an "A" limit switch 94, a "B" limit switch 95, and a lap belt switch 97. Switches 93, 94, 95 and 97 each have one side connected to ground and another side connected to passenger side logic block 81. Passenger door switch 93 and lap belt switch 97 are further connected to timer trigger 65. Passenger side logic 81 is connected to motor timer output 66b. A relay 82 and a relay 83 receive output signals from passenger side logic 81 and provide power to a passenger side motor 84. A "B" detector 85 receives an input from passenger side logic 81 and provides an output to warning indicator 76.

An inertia switch 87 for detecting large accelerations of the vehicle as would occur during a collision provides a signal to motor timer 66.

In operation, logic blocks 71 and 81 respectively select a belt carrier position at either the "A" pillar or the "B" pillar (i.e., one of the corresponding relays 72 or 73 and 82 or 83 are selected) based on the positions of their corresponding sensor switches 70 and 80. However, the selected relay is not energized unless a trigger event occurs and a signal is received from motor timer 66. Thus, when the ignition is turned on or when a door opens or closes, timer trigger 65 sends a trigger event signal to initiate the timing of motor timer 66.

Even though the opening of a door initiates the timing of motor timer 66, if the lap belt on the same side as the door is engaged then the respective logic block 71 or 81 still does not energize the "travel to A" relay.

When a lap belt signal transitions to the state indicating a disengaged lap belt, a trigger event signal is generated by timer trigger 65. If the respective door is open, then the respective logic block energizes the "travel to A" relay.

When either the appropriate limit switch is opened by the belt carrier or motor timer 66 times out, the logic block 71 or 81 turns off the relay which had been energized. If motor timer 66 times out without the opening of the appropriate limit switch, the appropriate logic block 71 or 81 provides a signal to corresponding "B" detector 75 or 85. Upon receipt of the signal, "B" detector 75 of 85 energizes a warning indicator 76 until the torso belt is moved to the proper location.

Inertia switch 87 senses the occurrence of a collision and inhibits the operation of motor timer 66. Thus, during a collision, the belt carriers will not be allowed to move no matter what the sensed conditions are, thus protecting the vehicle occupants.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A carrier motor control for a passive restraint system in a vehicle, said restraint system having a manual lap belt and having a torso belt carrier movable along a track between a forward position and a rearward position by energizing a carrier motor, said control comprising:
   lap belt sensing means for providing a lap belt signal indicating whether said manual lap belt is engaged;
   door sensing means for providing a door signal indicating whether a door of said vehicle is open; and
   logic means coupled to said lap belt sensing means, said door sensing means, and said carrier motor for selecting the direction of movement of said carrier toward one of said positions depending on said door signal but preventing movement of said carrier from said rearward position to said forward position if said lap belt signal indicates that said lap belt is engaged.

2. The control of claim 1 wherein said manual lap belt includes a tongue and a buckle and wherein said lap belt sensing means is comprised of an electrical switch which is actuated by insertion of said tongue into said buckle.

3. A passive restraint system for a vehicle comprising:
   a track extending between a forward position and a rearward position;
   a torso belt for restraining an occupant of said vehicle;
   a retractor having one end of said torso belt spooled thereon;
   a carrier movable in said track and connected to the other end of said torso belt;
   a carrier motor for causing movement of said carrier;
   relay means connected to said carrier motor for providing electrical power to said carrier motor in a manner to cause selectable movement of said carrier toward either one of said positions;
   a manual lap belt;
   lap belt sensing means for providing a lap belt signal indicating whether said manual lap belt is engaged;
   door sensing means for providing a door signal indicating whether a door of said vehicle is open; and
   logic means coupled to said lap belt sensing means, said door sensing means, and said relay means for selecting the direction of movement of said carrier toward one of said positions depending on said door signal but Preventing movement of said carrier from said rearward position to said forward position if said lap belt signal indicates that said lap belt is engaged.

4. The system of claim 2 wherein said manual lap belt includes a tongue and a buckle and wherein said lap belt sensing means is comprised of an electrical switch which is actuated by insertion of said tongue into said buckle.

5. A method for operating a carrier motor for a passive restraint system in a vehicle to locate a belt carrier in a proper forward or rearward position depending on the positions of a vehicle ignition switch and a door switch, said passive restraint system including a manual lap belt, said method comprising the steps of:
   locating said belt carrier in said forward position to allow an occupant to become seated in said vehicle;
   moving said belt carrier to said rearward position when said door switch indicates that a vehicle door is closed and said ignition switch is on; and
   maintaining said belt carrier in said rearward position while said manual lap belt is engaged.

* * * * *